US011379527B2

(12) United States Patent
Shmiel (10) Patent No.: US 11,379,527 B2
(45) Date of Patent: Jul. 5, 2022

(54) SIBLING SEARCH QUERIES (71) Applicant: Google LLC, Mountain View, CA (US)

(72) Inventor: Tomer Shmiel, Tel Aviv (IL)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/615,980

(22) PCT Filed: Aug. 21, 2019

(86) PCT No.: PCT/US2019/047418
§ 371 (c)(1),
(2) Date: Nov. 22, 2019

(87) PCT Pub. No.: WO2020/041413
PCT Pub. Date: Feb. 27, 2020

(65) Prior Publication Data
US 2021/0334314 A1 Oct. 28, 2021

Related U.S. Application Data (60) Provisional application No. 62/720,604, filed on Aug. 21, 2018.

(51) Int. Cl.
G06F 7/00 (2006.01)
G06F 16/9032 (2019.01)
(Continued)

(52) U.S. Cl.
CPC ......... G06F 16/90324 (2019.01); G06N 5/04 (2013.01); G06N 20/00 (2019.01)

(58) Field of Classification Search
CPC .............. G06F 16/90324; G06F 16/29; G06F 16/3334; G06F 16/9535; G06F 16/3344;
(Continued)

(56) References Cited

U.S. PATENT DOCUMENTS 6,947,930 B2  9/2005  Anick et al.
7,634,462 B2  12/2009  Weyand et al.
(Continued)

OTHER PUBLICATIONS

European Patent Office; Communication Pursuant to Article 94(3) EPC issued in Application No. 19762608.8; 9 pages; dated Sep. 10, 2021.
(Continued)

Primary Examiner — Mohammad A Sana
(74) Attorney, Agent, or Firm — Middleton Reutlinger (57) ABSTRACT Methods, systems, and apparatus, including computer programs encoded on a computer storage medium, for determining a plurality of sibling search queries for an input search query. In one aspect, a method comprises: receiving an input search query that satisfies a context template comprising a sequence of one or more words and a wildcard, wherein a wildcard represents variable data, wherein the input search query satisfies the context template and comprises a target word sequence that corresponds to the wildcard in the context template; and determining a plurality of sibling search queries for the input search query, wherein each sibling search query satisfies the context template and comprises a sibling word sequence that corresponds to the wildcard in the context template.

20 Claims, 5 Drawing Sheets (51) Int. Cl.
 *G06N 20/00* (2019.01)
 *G06N 5/04* (2006.01)
(58) Field of Classification Search
 CPC ............. G06F 16/3323; G06F 16/9537; G06F 16/951; G06F 16/3329; G06F 16/2455; G06F 40/44; G06F 40/51; G06F 40/55; G06F 40/58; G06N 20/00; G06N 5/04; G06N 3/08
 See application file for complete search history.

(56) References Cited

U.S. PATENT DOCUMENTS

| | | | |
|---|---|---|---|
| 7,774,353 B2 | 8/2010 | Millett et al. | |
| 8,055,669 B1 | 11/2011 | Singhal et al. | |
| 8,661,051 B1* | 2/2014 | Garg | G06F 16/951 707/767 |
| 10,747,962 B1* | 8/2020 | Fuerstenau | G06F 40/44 |
| 2014/0330866 A1* | 11/2014 | Hess | G06F 16/2455 707/771 |
| 2016/0239490 A1 | 8/2016 | Dhamdhere et al. | |

OTHER PUBLICATIONS

Fei et al., "Learning from homologous queries and semantically related terms for query auto completion", Information Processing and Management Elsevier, Jan. 2016, 52(4):628-643.

International Search Report and Written Opinion in International Application No. PCT/US2019/047418, dated Oct. 22, 2019, 13 pages.

Jones et al., "Generating query substitutions", WWW 2006 Proceedings of the 15th International Conference on World Wide Web, May 2006, pp. 387-396.

Rong et al., "EgoSet: Exploiting Word Ego-networks and User-generated Ontology for Multifaceted Set Expansion", Web Search and Data Mining, Feb. 2016, pp. 645-654.

* cited by examiner

FIG. 5

SIBLING SEARCH QUERIES

CROSS-REFERENCE TO RELATED APPLICATION

This application is a National Stage Application under 35 U.S.C. § 371 and claims the benefit of International Application No. PCT/US2019/047418, filed Aug. 21, 2019, which claims priority to U.S. Application No. 62/720,604, filed Aug. 21, 2018, the disclosure of which is incorporated herein by reference.

BACKGROUND

This specification relates to information retrieval.

The Internet provides access to a wide variety of electronic documents, such as image files, audio files, video files, and webpages. A search system can identify electronic documents that are responsive to search queries. The search queries can include one or more search terms.

SUMMARY

This specification describes a system implemented as computer programs on one or more computers in one or more locations that can process a search query to generate a set of sibling search queries.

According to a first aspect there is provided a method implemented by a data processing apparatus, the method comprising: receiving an input search query that satisfies a context template comprising a sequence of one or more words and a wildcard, wherein a wildcard represents variable data, wherein the input search query satisfies the context template and comprises a target word sequence that corresponds to the wildcard in the context template; and determining a plurality of sibling search queries for the input search query. For each sibling search query: the sibling search query satisfies the context template and comprises a sibling word sequence that corresponds to the wildcard in the context template; and determining the sibling search query comprises determining a sibling score based on: (i) a first set of multiple search queries from a search query log, wherein each search query in the first set of multiple search queries comprises the target word sequence, and (ii) a second set of multiple search queries from the search query log, wherein each search query in the second set of multiple search queries comprises the sibling word sequence. The sibling score quantifies a similarity measure between a first set of multiple search query templates and a second set of multiple search query templates. Each search query template in the first set of multiple search query templates comprises a sequence of one or more words and a wildcard and is defined by replacing the target word sequence in a search query from the first set of search queries by a wildcard. Each search query template in the second set of multiple search query templates comprises a sequence of one or more words and a wildcard and is defined by replacing the sibling word sequence in a search query from the second set of search queries by a wildcard.

The methods described herein provide an effective means of determining sibling search queries associated with an input search query. Sibling search queries can be considered to be search queries having a similar context to that of the input search query. For instance, the sibling search queries may ask for the same type of information as the input search query, but for a different target (for instance, "what is the weather in [Spain]" and "what is the weather in [Britain]").

The sibling score is based on a similarity measure between first and second sets of search query templates, each of which are derived from the search query log. This provides a mechanism for generating related search queries without relying on natural language processing. This means that related search queries can be determined without the use of a pre-trained machine learning model. Furthermore, as this mechanism is independent of natural language processing, it can be used to generate training data for training a natural language processing machine learning model.

According to an embodiment the method further comprises using the sibling search queries to train a natural language processing machine learning model.

According to a further embodiment the target word sequence comprises a plurality of words and the sibling word sequence comprises a plurality of words.

The sibling score may be determined by determining the number of matching search query templates in the first and second sets of multiple search query templates. According to a further embodiment the sibling score is a ratio of: (i) a number of search query templates common to both the first set of multiple search query templates and the second set of multiple search query templates, and (ii) a number of search query templates in the first set of multiple search query templates or the second set of multiple search query templates. This is a computationally efficient mechanism for determining the similarity between the input search query and a prospective sibling search query.

According to a further embodiment the first set of multiple search query templates and the second set of multiple search query templates include a same number of search query templates.

According to a further embodiment each search query in the first set of multiple search queries is selected based on a similarity between the search query and the input search query, and wherein each search query in the second set of multiple search queries is selected based on a similarity of the search query and the sibling search query.

According to a further embodiment the similarity between a given search query and the input search query is based on logged data characterizing: (i) user interaction with search results provided in response to receiving the input search query, and (ii) user interaction with search results provided in response to receiving the given search query. As the similarity is not determined based on natural language processing (is independent of natural language processing techniques), this acts as an effective means for producing training data for training a natural language processing machine learning model.

According to a further embodiment each search query in the first set of multiple search queries is selected based on a popularity of the search query, and wherein each search query in the second set of multiple search queries is selected based on the popularity of the search query. For instance, a predefined number of the most popular search queries might be selected from a selection of search queries related to the respective search query (the input search query or the sibling search query).

According to a second aspect there is provided one or more non-transitory computer storage media storing instructions that when executed by one or more computers cause the one or more computers to perform operations comprising: receiving an input search query that satisfies a context template comprising a sequence of one or more words and a wildcard, wherein a wildcard represents variable data, wherein the input search query satisfies the context template and comprises a target word sequence that corresponds to the wildcard in the context template; and determining a plurality of sibling search queries for the input search query. For each sibling search query: the sibling search query satisfies the context template and comprises a sibling word sequence that corresponds to the wildcard in the context template; and determining the sibling search query comprises determining a sibling score based on: (i) a first set of multiple search queries from a search query log, wherein each search query in the first set of multiple search queries comprises the target word sequence, and (ii) a second set of multiple search queries from the search query log, wherein each search query in the second set of multiple search queries comprises the sibling word sequence. The sibling score quantifies a similarity measure between a first set of multiple search query templates and a second set of multiple search query templates. Each search query template in the first set of multiple search query templates comprises a sequence of one or more words and a wildcard and is defined by replacing the target word sequence in a search query from the first set of search queries by a wildcard. Each search query template in the second set of multiple search query templates comprises a sequence of one or more words and a wildcard and is defined by replacing the sibling word sequence in a search query from the second set of search queries by a wildcard.

According to an embodiment the operations further comprise using the sibling search queries to train a natural language processing machine learning model.

According to a further embodiment the target word sequence comprises a plurality of words and the sibling word sequence comprises a plurality of words.

According to a further embodiment the sibling score is a ratio of: (i) a number of search query templates common to both the first set of multiple search query templates and the second set of multiple search query templates, and (ii) a number of search query templates in the first set of multiple search query templates or the second set of multiple search query templates.

According to a further embodiment the first set of multiple search query templates and the second set of multiple search query templates include a same number of search query templates.

According to a further embodiment each search query in the first set of multiple search queries is selected based on a similarity between the search query and the input search query, and wherein each search query in the second set of multiple search queries is selected based on a similarity of the search query and the sibling search query.

According to a third aspect there is provided a system comprising one or more computers and one or more storage devices storing instructions that when executed by the one or more computers cause the one or more computers to perform operations comprising: receiving an input search query that satisfies a context template comprising a sequence of one or more words and a wildcard, wherein a wildcard represents variable data, wherein the input search query satisfies the context template and comprises a target word sequence that corresponds to the wildcard in the context template; and determining a plurality of sibling search queries for the input search query. For each sibling search query: the sibling search query satisfies the context template and comprises a sibling word sequence that corresponds to the wildcard in the context template; and determining the sibling search query comprises determining a sibling score based on: (i) a first set of multiple search queries from a search query log, wherein each search query in the first set of multiple search queries comprises the target word sequence, and (ii) a second set of multiple search queries from the search query log, wherein each search query in the second set of multiple search queries comprises the sibling word sequence. The sibling score quantifies a similarity measure between a first set of multiple search query templates and a second set of multiple search query templates. Each search query template in the first set of multiple search query templates comprises a sequence of one or more words and a wildcard and is defined by replacing the target word sequence in a search query from the first set of search queries by a wildcard. Each search query template in the second set of multiple search query templates comprises a sequence of one or more words and a wildcard and is defined by replacing the sibling word sequence in a search query from the second set of search queries by a wildcard.

According to a further embodiment the operations further comprise: using the sibling search queries to train a natural language processing machine learning model.

According to a further embodiment the target word sequence comprises a plurality of words and the sibling word sequence comprises a plurality of words.

According to a further embodiment the sibling score is a ratio of: (i) a number of search query templates common to both the first set of multiple search query templates and the second set of multiple search query templates, and (ii) a number of search query templates in the first set of multiple search query templates or the second set of multiple search query templates.

According to a further embodiment the first set of multiple search query templates and the second set of multiple search query templates include a same number of search query templates.

According to a further embodiment each search query in the first set of multiple search queries is selected based on a similarity between the search query and the input search query, and wherein each search query in the second set of multiple search queries is selected based on a similarity of the search query and the sibling search query Particular embodiments of the subject matter described in this specification can be implemented so as to realize one or more of the following advantages.

The system described in this specification can automatically (i.e., with minimal human intervention) mine training data to be used in training a natural language processing machine learning model. More specifically, the sets of sibling search queries generated by the system described in this specification can be used to train a machine learning model to recognize many variations of how search queries can be expressed. In a particular example, the system described in this specification can generate training data used to train a machine learning model which determines if a "weather panel" (i.e., a box displaying weather information) should be presented to a user in response to the user submitting a search query to a search engine. In contrast, some conventional methods for acquiring training data used to train natural language processing machine learning models require human intervention (and are therefore less efficient than the automatic method described in this specification). This is an improvement in the field of natural language processing.

The system described in this specification can determine sibling search queries based entirely on information which can be extracted from search query logs. In particular, unlike some conventional natural language processing systems, the system described in this specification does not rely on explicitly determining the "types" of words or phrases included in search queries. This enables the system described in this specification to be more robust and widely applicable than it otherwise would be. This is also an improvement in the field of natural language processing The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system for processing an input search query to generate a set of sibling search queries. The input search query (e.g., "[hello] in spanish") is characterized by a context template (e.g., "[*] in spanish") and a target word sequence (e.g., "hello") that corresponds to the "wildcard" in the context template. Each sibling search query satisfies the same context template and includes a word sequence corresponding to the wildcard in the context template which can be understood to be of the same "type" as the target word sequence when substituted into the context template. For example, the system may determine "[thank you] in spanish" to be a sibling search query for the input search query since it satisfies the context template and can be understood to express a similar intent of translating a word or word sequence from English to Spanish. On the other hand, the system may determine "[english] in spanish" not to be a sibling search query for the input search query, because despite satisfying the context template, it can be understood to express an intent of a much broader scope than the input search query. These features and other features are described in more detail below.

Figure 1:
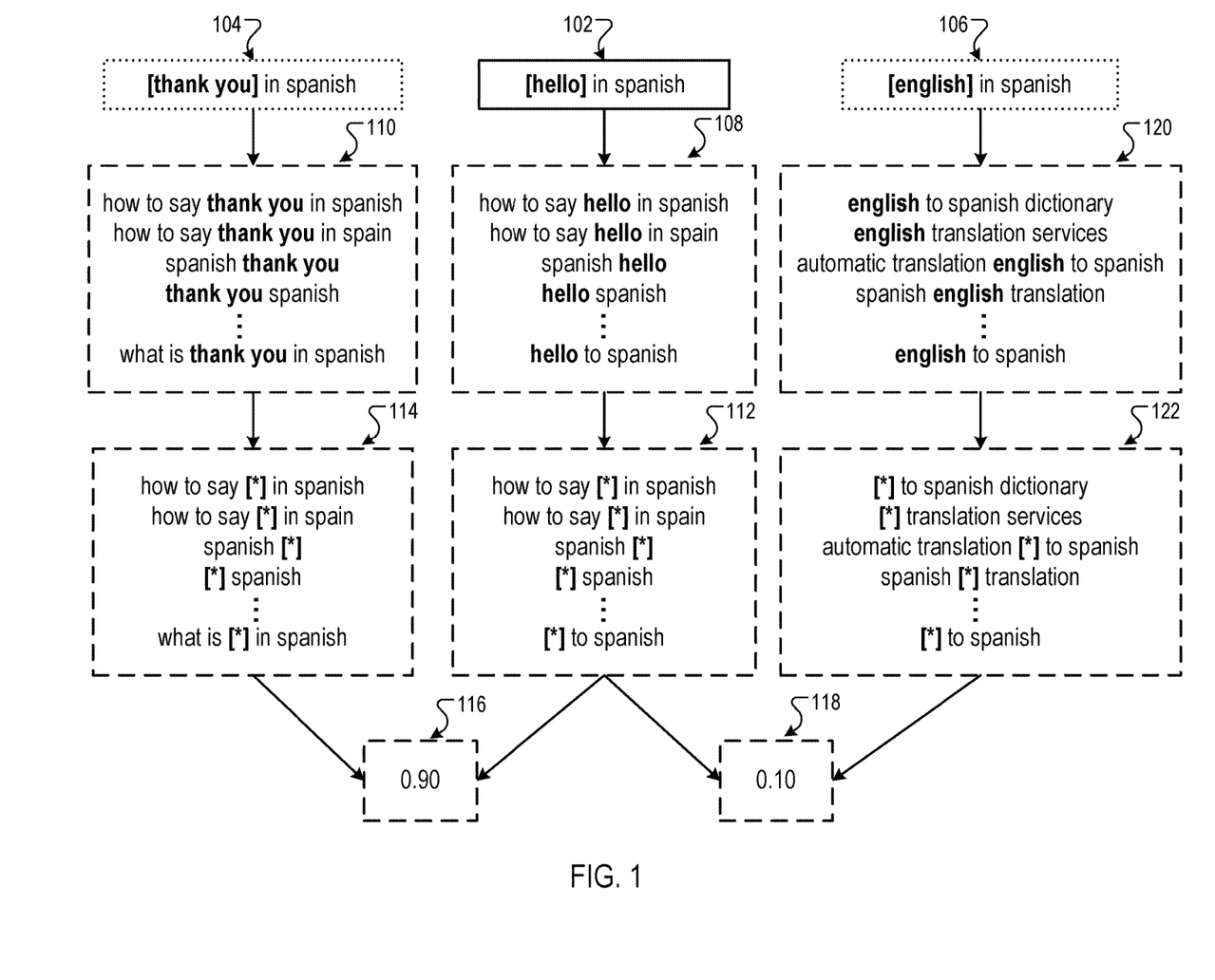
FIG. 1 depicts example search queries, search query templates, and sibling scores.

FIG. 1 depicts an input search query 102 "hello in spanish" which is characterized by: (i) a context template (e.g., "[*] in spanish"), and (ii) a target word sequence of one or more words (e.g., "hello") that corresponds to a "wildcard" in the context template. Generally, the context template is defined by an ordered sequence of one or more words and a wildcard (which is represented in this specification by the symbol [*]). A wildcard refers to a placeholder representing variable data that can be specified by any sequence of one or more words (e.g., including but not limited to the target word sequence). For brevity, certain portions of this specification may refer to "the" wildcard in a context template, but more generally, a context template can include multiple wildcards, and the description in this specification is not limited to the case of context templates that include only one wildcard. For convenience, the input search query 102 is expressed as "[hello] in spanish" in the specification and drawings, where square brackets indicate the position of the words in the search query which specify the wildcard in the context template (e.g., the target word sequence "hello").

Similarly, a search query such as "thank you in spanish" 104 which satisfies the context template is expressed as "[thank you] in spanish", where the square brackets indicate the position of the words in the search query which correspond to the wildcard in the context template. As another example, the search query "english in spanish" 106 is expressed as "[english] in spanish".

Generally, a search query can be defined by a sequence of one or more words, and a context template can be defined by a sequence of one or more words and one or more wildcards. A given search query is said to "satisfy" a context template if there exists a respective sequence of one or more words corresponding to each wildcard of the context template such that substituting each wildcard with the corresponding sequence of words results in a search query that matches the given search query. As used throughout this document, a "word" refers to a sequence of one or more characters, e.g., alphabetical characters, numerical characters, special characters (e.g., "#"), or any other appropriate characters.

While many queries may satisfy the context template of the input search query 102, not all queries that satisfy the context template are sibling queries. In particular, only search queries that satisfy the context template and which have a sufficiently high sibling score are determined to be sibling search queries of the input search query 102. The sibling score between a particular search query and the input search query 102 may characterize whether, for each wildcard of the context template, the respective words corresponding to the wildcard in: (i) the particular search query, and (ii) the input search query 102, are of the same "type". Two sequences of words can be understood to be of the same "type" relative to a wildcard of a context template if substituting each sequence of words into the context template in place of the wildcard results in respective search queries having the same category of intention. A few examples follow.

For example, the search query 104 "[thank you] in spanish" may be determined to be a sibling search query of the input search query 102 "[hello] in spanish". The search query 104 "[thank you] in spanish" satisfies the context template "[*] in spanish". Moreover, the words "thank you" from the search query 104 "[thank you] in spanish" which correspond to the wildcard in the context template can be understood to be of the same type as the word "hello" from the input search query 102 "[hello] in spanish" which corresponds to the wildcard in the context template. For example, when substituted into the context template in place of the wildcard, both "hello" and "thank you" can be understood as individual words or sequences of words that are intended to be translated from the English language into the Spanish language.

As another example, the search query 106 "[english] in spanish" may be determined not to be a sibling search query of the input search query 102 "[hello] in spanish". In this example, although the search query 106 "[english] in spanish" satisfies the context template "[*] in spanish", the word "english" (which corresponds to the wildcard in the context template) can be understood to be of a different type than the word "hello" (which corresponds to the wildcard in the context template). For example, when the word "english" is substituted into the context template in place of the wildcard, the resulting search query may express an intent broadly related to English to Spanish translation, while substituting the word "hello" in place of the wildcard may express an intent to translate an individual word.

Generally, the sibling score between the input search query 102 and a given search query can be determined by comparing the respective structures of: (i) a first set of search queries that are each determined to be similar to the input search query 102, and (ii) a second set of search queries that are each determined to be similar to the given search query. The similarity between search queries can, for example, be determined from logged search data characterizing user interaction with search results provided in response to receiving respective search queries (as will be described in more detail below).

For example, to determine the sibling score between the input search query 102 "[hello] in spanish" and the search query 104 "[thank you] in spanish", sets of similar search queries 108 and 110 are retrieved (e.g., from a search query log). Each search query in the first set of search queries 108 is determined to be similar to the input search query 102 "[hello] in spanish" and includes the target word sequence "hello". For example, the similar search queries 108 may include: "how to say hello in spanish" and "hello to spanish".

On the other hand, each search query in the second set of similar search queries 110 is determined to be similar to the search query 104 "[thank you] in spanish" and includes the word sequence "thank you" from the search query 104 that specifies the wildcard in the context template. For example, the similar search queries 110 may include: "thank you spanish" and "what is thank you in spanish".

To compare the structure of the set of similar search queries 108 corresponding to "[hello] in spanish" 102 and the set of similar search queries 110 corresponding to "[thank you] in spanish" 104, respective sets of search query templates 112 and 114 are generated. More specifically, the first set of search query templates 112 is generated from the set of similar search queries 108 that are determined to be similar to "[hello] in spanish" 102 by replacing the target word sequence "hello" in each search query in the set of similar search queries 108 by a wildcard. For example, the search query template "how to say [*] in spanish" is generated by replacing the target word sequence "hello" in the search query "how to say hello in spanish" by a wildcard. Similarly, the second set of search query templates 114 is generated from the set of similar search queries 110 that are determined to be similar to "[thank you] into spanish" 104 by replacing the words "thank you" by a wildcard. For example, the search query template "what is [*] in spanish" is generated by replacing the word sequence "thank you" in the search query "what is thank you in spanish" by a wildcard.

The sibling score between "[hello] in spanish" and "[thank you] in spanish" can be determined by computing a similarity measure between the set of search query templates 112 generated from "[hello] in spanish" and the set of search query templates 114 generated from "[thank you] in spanish". For example, the sibling score can be determined based on the intersection of the set of search query templates 112 and the set of search query templates 114. That is, the sibling score can be determined based on how many search query templates are common to both the set of search query templates 112 and the set of search query templates 114. For example, the search query template "how to say [*] in spanish" is common to both the set of search query templates 112 and the set of search query templates 114. As another example, the search query template "what is [*] in spanish"

is included in the set of search query templates 114 but not in the set of search query templates 112.

In a particular example, the sibling score between "[hello] in spanish" and "[thank you] in spanish" may be proportional to the number of search query templates in common between the set of search query templates 112 and the set of search query templates 114. For example, the sibling score may be determined as the ratio between: (i) the number of search query templates in the intersection of the set of search query templates 112 and the set of search query templates 114, and (ii) the number of search query templates in the set of search query templates 112 or the set of search query templates 114. For example, if the sets of search query templates 112 and 114 both contain 10 search query templates, and they share 9 search query templates in common, then the sibling score 116 may be determined as 0.9 (i.e., 9/10).

To determine the sibling score 118 between the input search query 102 "[hello] in spanish" and the search query 106 "[english] in spanish", the set of similar search queries 120 and the set of search query templates 122 are determined from "[english] to spanish" (e.g., using the previously described procedure). The different intent expressed by "[hello] in spanish" and "[english] in spanish" may be reflected in a low sibling score 118 (e.g., a sibling score of 0.10).

To determine a set of sibling search queries for the input search query 102, a respective sibling score can be computed between the input search query 102 and each other search query (e.g., in a log of search queries) that satisfies the context template. In some cases, a sibling score may be computed between the input search query 102 and proper subset of the other search queries that satisfy the context template (i.e., rather than every other search query satisfying the context template). The set of sibling search queries for the input search query 102 can be determined based on the sibling scores. For example, a predetermined number of search queries with the highest sibling scores may be determined to be the sibling search queries for the input search query 102. Alternatively, a predefined threshold may be used such that each search query that satisfies the context template and has a sibling score that satisfies the predefined threshold is selected as a sibling search query.

The described procedure for generating sets of sibling search queries for an input search query can be used to automatically (i.e., with minimal human intervention) mine training data to be used in training a natural language processing machine learning model. In a particular example, a machine learning model may be trained to generate an output characterizing whether a "weather panel" (i.e., a box displaying weather information) should be presented to a user in response to the user submitting a search query to a search engine. The machine learning model may be trained based on training data including sibling queries generated as described in this specification which automatically capture variations in how weather-related search queries can be expressed. An example training system that trains a natural language processing machine learning model using sets of sibling search queries generated using a sibling scoring system is described in more detail with reference to FIG. 3.

Figure 2:
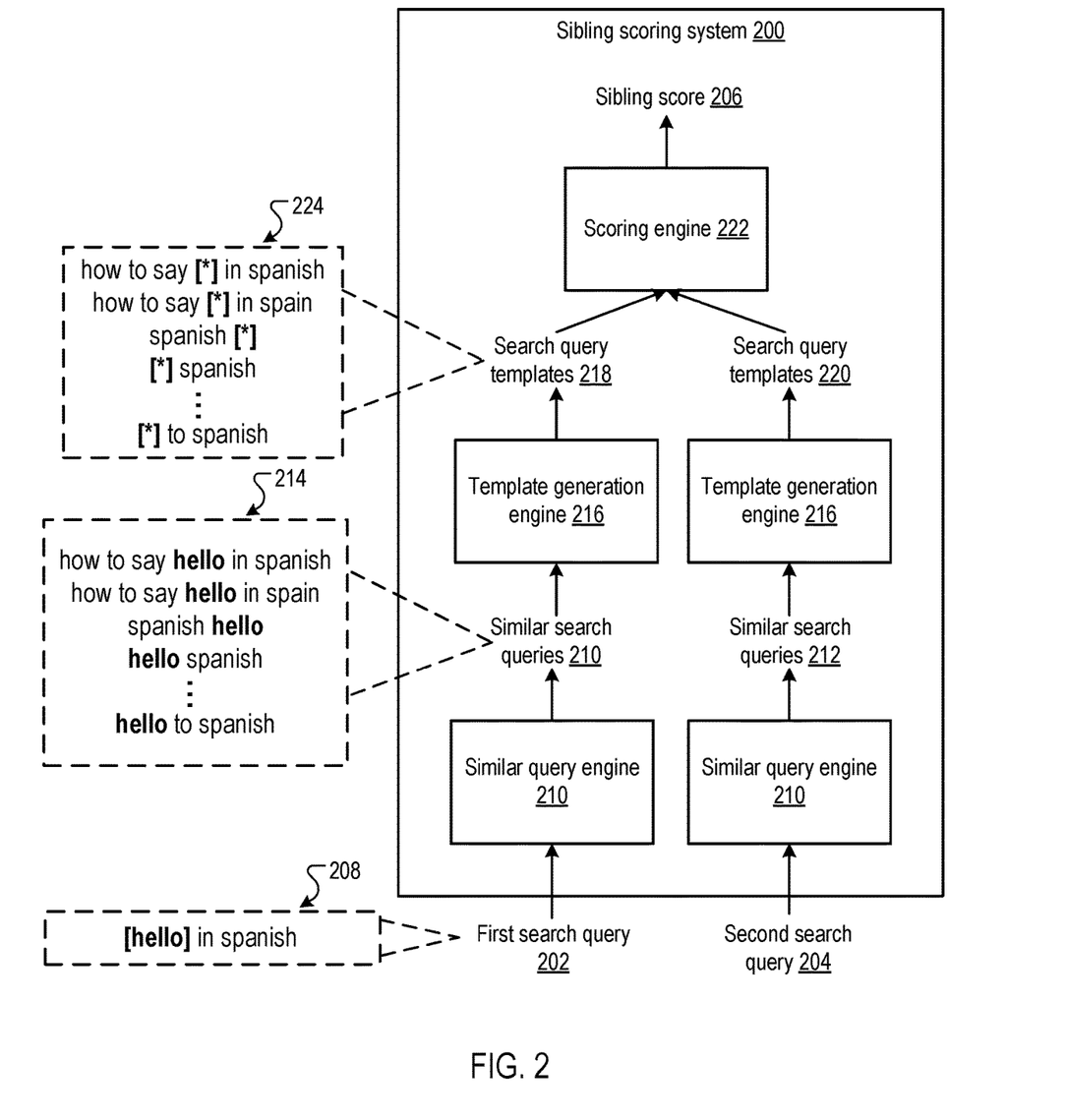
FIG. 2 is a block diagram of an example sibling scoring system.

FIG. 2 shows an example sibling scoring system 200. The sibling scoring system 200 is an example of a system implemented as computer programs on one or more computers in one or more locations in which the systems, components, and techniques described below are implemented.

The sibling scoring system 200 described with reference to FIG. 2 is an example implementation of a system for determining sibling scores between search queries. However, other implementations of the sibling scoring system 200 are possible which can enable sibling scores between pairs of search queries to be more rapidly determined by precomputing (e.g., by offline processing) portions of the data necessary to determine sibling scores.

The sibling scoring system 200 is configured to process a first search query 202 and a second search query 204 to determine a sibling score 206 between the first search query 202 and the second search query 204. Both the first search query 202 and the second search query 204 provided to the system 200 are characterized by the same context template and respective sequences of words that specify the wildcard in the context template. For example, the context template may be "[*] in spanish", the first search query 202 may be "[hello] in spanish" (as depicted by 208), and the second search query 204 may be "[thank you] in spanish". In this example, the word "hello" specifies the wildcard in the context template for the first search query 202, and the words "thank you" specify the wildcard in the context template for the second search query 204.

The system 200 processes the first search query 202 and the second search query 204 using a similar query engine 210 to determine sets of similar search queries 210 and 212 for the first search query 202 and the second search query 204 respectively. The similar query engine 210 is configured to determine the set of similar search queries 210 for the first search query 202 by retrieving a set of search queries from a search query log, each of which include the word sequence specifying the wildcard in the context template for the first search query 202. For example, the set of similar search queries 210 for the first search query 202 may include the search queries: "how to say hello in spanish" and "spanish hello" (as depicted by 214), where the word "hello" specifies the wildcard in the context template for the first search query 202. The similar query engine 210 is configured to determine the set of similar search queries 212 for the second search query 204 using an analogous procedure as for the first search query 202.

The similar query engine 210 may process an input search query to identify a corresponding set of similar search queries in any of a variety of ways, e.g., based on data characterizing user interaction with search results responsive to the input search query. In one example, to identify similar search queries for an input search query, the similar query engine 210 may identify a set of search results having a highest interaction score relative to the input search query. The interaction score for a search result relative to the input search query may characterize how frequently users interact with the search result when the search result is provided in response to the user submitting the input search query. A user can interact with a search result in any of a variety of ways, e.g., by clicking on the search result. The similar query engine 210 may identify a particular search query as similar to the input search query if the respective sets of search results having the highest interaction scores relative: (i) the input search query, and (ii) the particular search query, share at least a predetermined number of search results.

In some cases, the similar query engine 210 may identify the set of similar search queries corresponding to the input search query as a predetermined number of most "popular" search queries that are similar to the input search query. The popularity of a search query may refer to, e.g., how frequently the search query is submitted to a search system, and may be determined by processing data from a query log of the search system, e.g., as described with reference to FIG. 4.

The system 200 processes the set of similar search queries 210 determined by the similar query engine 210 for the first search query 202 using a template generation engine 216 to generate a set of search query templates 218 (e.g., depicted as 224). The template generation engine 216 is configured to generate the set of search query templates 218 by replacing the word sequence specifying the wildcard in the context template for the first search query 202 in each of the similar search queries 210 by a wildcard. For example, if the set of similar search queries 210 for the first search query 202 includes "how to say hello in spanish", then the template generation engine may generate a corresponding search query template in the set of search query templates 218 as "how to say [*] in spanish". The template generation engine 216 is configured to determine the set of search query templates 220 for the second search query 204 using an analogous procedure as for the first search query 202.

The system 200 processes the sets of search query templates 218 and 220 using a scoring engine 222 to generate the sibling score 206. The scoring engine 222 is configured to generate the sibling score 206 by determining a similarity measure between the set of search query templates 218 determined for the first search query 202 and the set of search query templates 220 determined for the second search query 204. For example, the scoring engine 222 may generate a sibling score proportional to the number of search query templates that are common to both the sets of search query templates 218 and 220.

Figure 3:
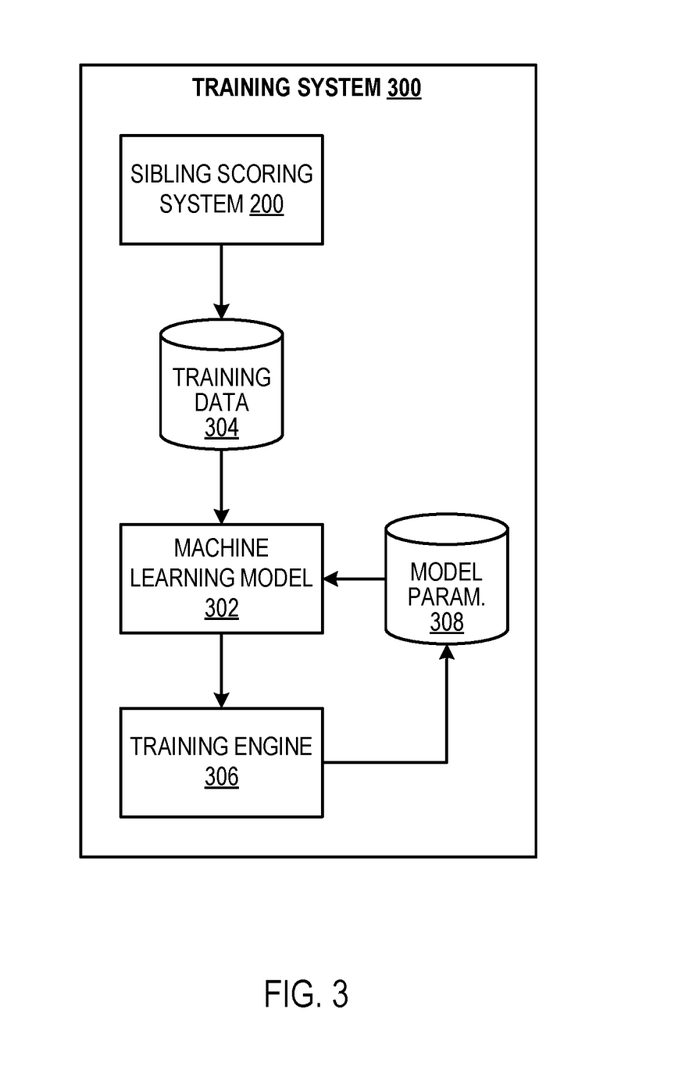
FIG. 3 shows an example training system that is configured train a natural language processing machine learning model based on training data generated using the sibling scoring system.

FIG. 3 shows an example training system 300 that is configured to train a natural language processing machine learning model 302 based on training data 304 generated using the sibling scoring system 200, e.g., as described with reference to FIG. 2. The training system 300 is an example of a system implemented as computer programs on one or more computers in one or more locations in which the systems, components, and techniques described below are implemented.

The machine learning model 302 may be configured to process a natural language input (e.g., a textual search query) to generate a classification output that defines a respective score for each of multiple classes. Each class may correspond to a possible intention, and the respective score for each class may indicate a likelihood that a user submitting natural language input has the intention specified by the class. In a particular example, the classification output may specify a score indicating a likelihood that a weather panel (i.e., a box displaying weather information) should be presented to a user submitting the natural language input as a search query to a search system.

The training data 304 includes multiple training examples, where each training example includes: (i) a training natural language input, and (ii) a corresponding target output that should be generated by the machine learning model by processing the training natural language input. In one example, the target output for each natural language input may be a binary variable indicating if a weather panel should be presented to a user submitting the natural language input as a search query to a search system.

The training system 300 can use the sibling scoring system 200 to populate the training data 304 with a large number of training examples. For example, starting from an initial training example consisting of a given search query and a corresponding target output, the training system 300 can use the sibling scoring system 200 to generate a large number of sibling search queries of the given search query having the same target output. The training system 300 can then train the machine learning model using training examples consisting of the sibling search queries and the corresponding target output. In a particular example, the training system 300 may train the machine learning model 302 to process a search query to predict if a weather panel should be presented in response to the search query (as described earlier). In this example, starting from the initial search query for which a weather panel should be presented, e.g., "weather [nyc]", the training system 300 can generate a large number of sibling search queries for which a weather panel should also be presented, e.g., "weather [paris]" and "weather [london]". In this example, the training system 300 uses the sibling scoring system 200 to directly mine the names of geographic locations (e.g., "nyc", "paris", "london", etc.) from search query logs without relying on a predefined (and potentially biased or incomplete) list of geographic locations.

Generally, the training system 300 uses a training engine 306 to adjust the model parameter values 308 of the machine learning model 302 to cause the machine learning model 302 to generate classification outputs that match the target outputs specified by the training examples. In one example, the machine learning model 302 may be a neural network model, and the training engine 306 may train the machine learning model 302 by iteratively adjusting the model parameter values 308 over multiple training iterations. At each training iteration, the training engine 306 may process training inputs from a "batch" (set) of one or more training examples in accordance with the current values of the model parameters 308 to generate corresponding classification outputs. The training engine 306 may adjust the model parameter values 308 using gradients of an objective function with respect to the model parameters, where the objective function measures a similarity between: (i) the classification outputs generated by the machine learning model, and (ii) the target outputs specified by the training examples. The training engine 306 may determine the gradients using, e.g., backpropagation techniques, and may adjust the model parameter values 308 using the gradients in accordance with any appropriate gradient descent algorithm, e.g., RMSprop or Adam.

Figure 4:
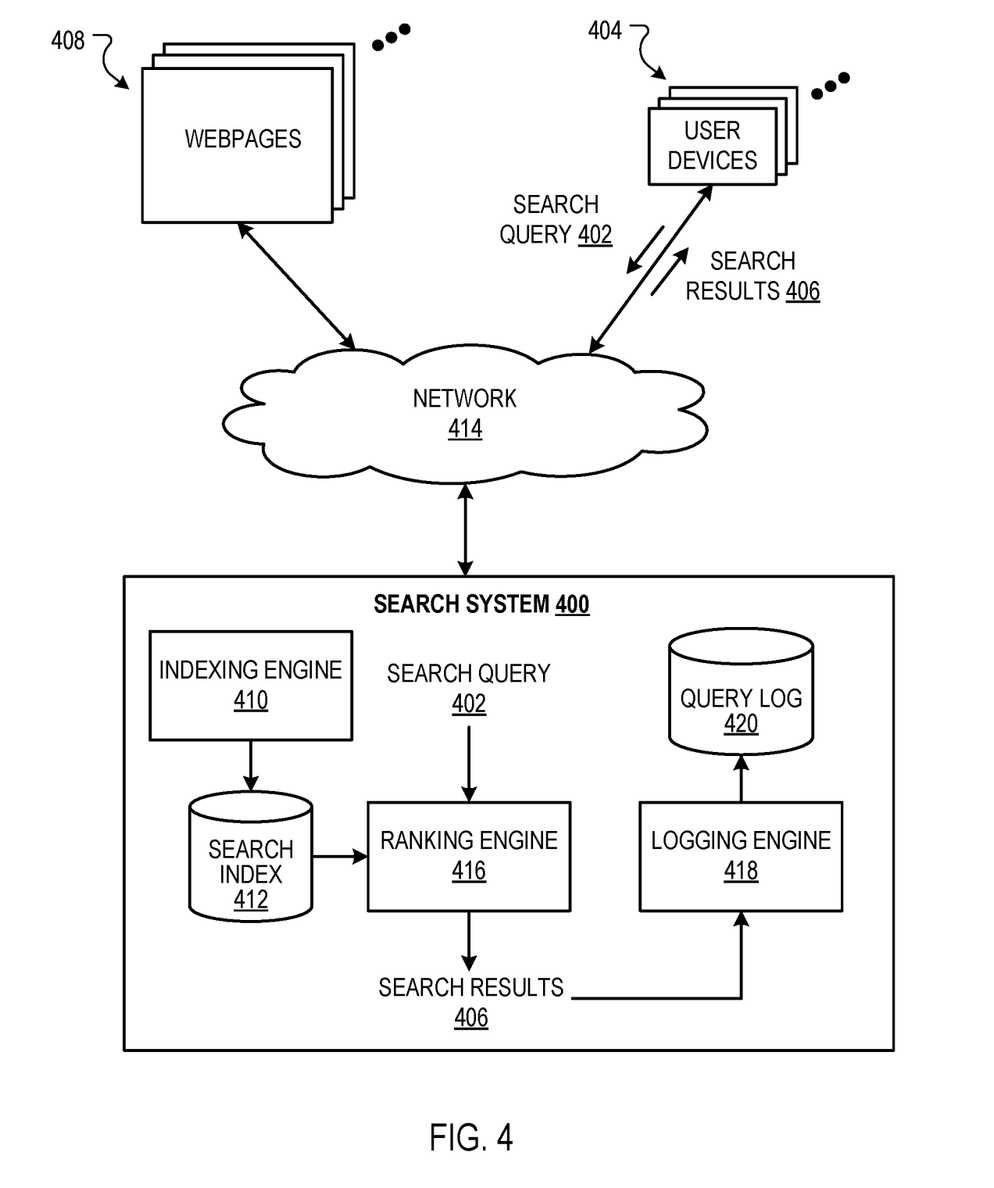
FIG. 4 shows an example search system.

FIG. 4 shows an example search system 400. The search system 400 is an example of a system implemented as computer programs on one or more computers in one or more locations in which the systems, components, and techniques described below are implemented.

The search system 400 is configured to receive a search query 402 from a user device 404, to process the search query 402 to determine one or more search results 406 responsive to the search query 402, and to provide the search results 406 to the user device 404. The search query 402 can include search terms expressed in a natural language (e.g., English), images, audio data, or any other appropriate form of data. A search result 406 identifies a webpage 408 that is responsive to the search query 402, and may include a link to the webpage 408. Webpages 408 can include content in any appropriate format, for example, images, text, and videos.

A network 414, such as a local area network (LAN), wide area network (WAN), the Internet, a mobile phone network, or a combination thereof, connects the webpages 408, the user devices 404, and the search system 400. In general, the network 414 can connect the search system 400 to many thousands of webpages 408 and user devices 404.

A user device 404 is an electronic device that is under control of a user and is capable of transmitting and receiving data over the network 414. The user applications included in the user device 404 can present the search results 406 received from the search system 400 to a user of the user device (e.g., by rendering a search results page which shows an ordered list of the search results 406). The user may select one of the search results 406 presented by the user device 404 (e.g., by clicking on a hypertext link included in the search result 406), which can cause the user device 404 to generate a request for a webpage 408 identified by the search result 406.

The search system 400 uses an indexing engine 410 to generate and maintain the search index 412 by "crawling" (i.e., systematically browsing) the webpages 408. For each of a large number (e.g., millions) of webpages 408, the search index 412 indexes the webpage by maintaining data which identifies the webpage 408 (e.g., by a link to the webpage 408).

The ranking engine 416 determines search results 406 responsive to the search query 402 by scoring webpages 408 indexed by the search index 412. The "relevance score" determined by the ranking engine 416 for a webpage characterizes how responsive (e.g., relevant) the webpage is to the search query 402. The ranking engine 416 determines a ranking of the webpages indexed by the search index 412 based on their respective relevance scores, and determines the search results based on the ranking. For example, the ranking engine 416 can generate search results 406 which identify the highest-ranked webpages 408 indexed by the search index 412.

The search system 400 can use a logging engine 418 to log data characterizing: (i) search queries, (ii) search results provided in response to the search queries, and (iii) data characterizing user interaction with the search results provided in response to search queries, in a query log 420. For example, the logging engine 418 may store data in the query log 420 that enables a sibling scoring engine to determine the interaction score for a search result relative to an input search query, e.g., as part of identifying a set of similar search queries for the input search query.

Figure 5:
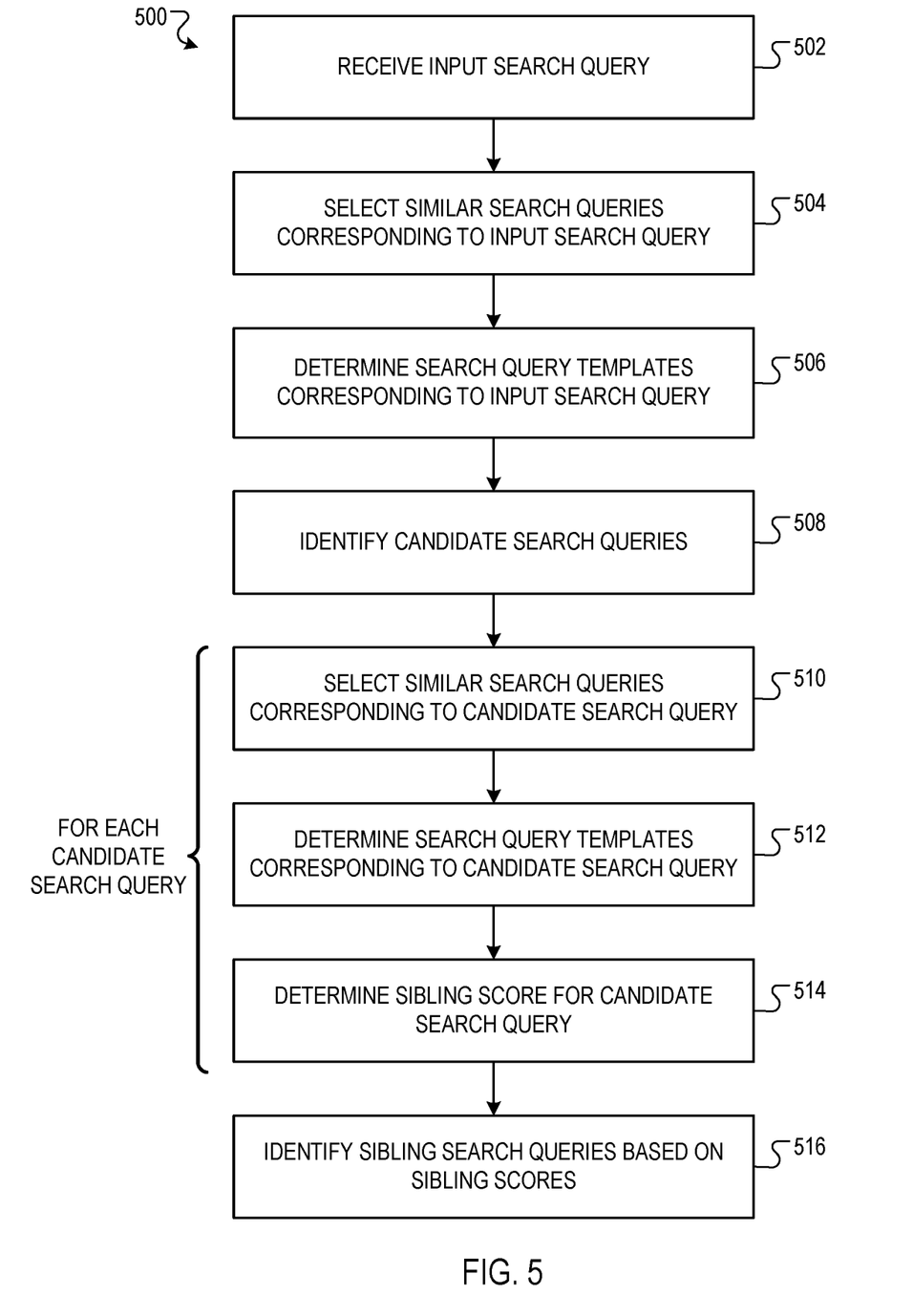
FIG. 5 is a flow diagram of an example process for identifying one or more sibling search queries corresponding to an input search query.

FIG. 5 is a flow diagram of an example process 500 for identifying one or more sibling search queries corresponding to an input search query. For convenience, the process 500 will be described as being performed by a system of one or more computers located in one or more locations. For example, a sibling scoring system, e.g., the sibling scoring system 200 of FIG. 2, appropriately programmed in accordance with this specification, can perform the process 500.

Generally, the system can perform variations of the process 500 that enable sibling search queries corresponding to the input search query to be determined more efficiently by precomputing portions of the data necessary to determine sibling scores.

The system receives an input search query that satisfies a context template (502). The context template has one or more words and one or more wildcards, where each wildcard represents variable data. For convenience, each word sequence in the input search query that correspond to a wildcard of the context template may be referred to as a "target" word sequence. For example, if the context template is "[*] in spanish" and the input search query is "[hello] in spanish", then "hello" may be referred to as a target word sequence.

The system selects a set of multiple search queries from a query log of a search system that each: (i) include the target word sequence(s), and (ii) satisfy a criterion for being "similar" to the input search query (504). The system may determine that a particular search query is similar to the input search query based on user interaction with respective search results provided by a search system in response to receiving the input search query and the particular search query. In some cases, the system may select a predetermined number of similar search queries corresponding to the input search query, e.g., based on the respective popularity of each similar search query.

The system determines a set of search query templates from the set of similar search queries corresponding to the input search query (506). In particular, the system generates a respective search query template for each search query in the set of similar search queries corresponding to the input search query. To generate the search query template for a similar search query corresponding to the input search query, the system replaces each target word sequence in the similar search query with a wildcard. For example, if the context template is "[*] in spanish" and the input search query is "[hello] in Spanish", then the system may map the similar search query "how to say [hello] in spanish" to the corresponding search query template "how to say [*] in spanish".

The system identifies a set of "candidate" search queries (e.g., from a search query log) that each satisfy the context template to be checked against the input search query as potential sibling search queries (508). For example, the system may identify every search query in the search query log that satisfies the context template as a candidate search query. For convenience, each word sequence in a candidate search query that correspond to a wildcard of the context template may be referred to as a "candidate sibling" word sequence. For example, if the context template is "[*] in spanish" and the candidate search query is "[thank you] in Spanish", then "thank you" may be referred to as a candidate sibling word sequence.

The steps 510-514 are performed for each candidate search query. For convenience, the description of the steps 510-514 that follows will reference a particular candidate search query.

The system selects a set of multiple search queries from the query log of the search system that each: (i) include the candidate sibling word sequence(s) of the candidate search query, and (ii) satisfy a criterion for being "similar" to the candidate search query (510). Selecting similar search queries is described in more detail with reference to step 504.

The system determines a set of search query templates from the set of similar search queries corresponding to the candidate search query (512). In particular, the system generates a respective search query template for each search query in the set of similar search queries corresponding to the candidate search query. To generate the search query template for a similar search query corresponding to the candidate search query, the system replaces each candidate sibling word sequence in the similar search query with a wildcard. For example, if the context template is "[*] in spanish" and the candidate search query is "[thank you] in Spanish", then the system may map the similar search query "how to say [thank you] in spanish" to the corresponding search query template "how to say [*] in spanish".

The system determines a sibling score between the candidate search query and the input search query by measuring a similarity between: (i) the set of search query templates corresponding to the input search query, and (ii) the set of search query templates corresponding to the candidate search query (514). For example, the system may determine the sibling score as a function of the ratio of: (i) the number of search query templates that correspond to both the input search query and the candidate search query, and (ii) either the total number of search query templates corresponding to input search query, or the total number of search query templates corresponding to the candidate search query.

The system identifies one or more of the candidate search queries as sibling search queries for the input search query (516). For example, the system may identify each candidate search query having a sibling score that satisfies a predetermined threshold as being a sibling search query for the input search query. After identifying the sibling search queries, the system may use the set of sibling search queries, e.g., to train a natural language processing machine learning model, as described above.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
   obtaining a given training example for training a machine learning model, wherein:
      the machine learning model is configured to process an input comprising a sequence of words to generate a classification output comprising a respective score for each of multiple classes; and
      the given training example comprises: (i) a given training input comprising a sequence of words, and (ii) a target output that should be generated by the machine learning model by processing the given training input;
   generating a plurality of new training examples based on the given training example, wherein each new training example comprises: (i) a new training input comprising a sequence of words, and (ii) the target output, wherein generating each new training example comprises:
      identifying, from a search query log, a first set of multiple search queries based on the given training input corresponding to the given training example;
      identifying, from the search query log, a second set of multiple search queries based on the new training input corresponding to the new training example;
      determining a sibling score between the given training input and the new training input based on: (i) the first set of multiple search queries, and (ii) the second set of multiple search queries; and
      determining that the sibling score between the given training input and the new training input satisfies an acceptance criterion; and
   training the machine learning model on the plurality of new training examples.

2. The method of claim 1, wherein the classification output generated by the machine learning model for an input comprises a score indicating if information on a given subject should be displayed to a user in response to the user submitting a search query comprising the input.

3. The method of claim 2, wherein the information on the given subject comprises weather information.

4. The method of claim 1, wherein:
   the sequence of words of the given training input and the sequence of words of the new training input both satisfy a context template;
   the context template comprises: (i) a sequence of one or more words and (ii) a wildcard representing variable data;
   the sequence of words of the given training input comprises a target word sequence that corresponds to the wildcard in the context template; and
   the sequence of words of the new training input comprises a sibling word sequence that corresponds to the wildcard in the context template.

5. The method of claim 4, wherein each search query in the first set of search queries comprises the target word sequence and each search query in the second set of search queries comprises the sibling word sequence.

6. The method of claim 5, wherein:
   the sibling score between the given training input and the new training input quantifies a similarity measure between a first set of search query templates and a second set of search query templates;
   each search query template in the first set of search query templates comprises a sequence of one or more words and a wildcard and is defined by replacing the target word sequence in a search query from the first set of search queries by a wildcard; and
   each search query template in the second set of search query templates comprises a sequence of one or more words and a wildcard and is defined by replacing the sibling word sequence in a search query from the second set of search queries by a wildcard.

7. The method of claim 6, wherein the sibling score is based on a ratio of: (i) a number of search query templates common to both the first set of search query templates and the second set of search query templates, and (ii) a number of search query templates in the first set of search query templates or the second set of search query templates.

8. The method of claim 7, wherein the first set of search query templates and the second set of search query templates include a same number of search query templates.

9. A system comprising:
   one or more computers; and
   one or more storage devices communicatively coupled to the one or more computers, wherein the one or more storage devices store instructions that, when executed by the one or more computers, cause the one or more computers to perform operations comprising:
   obtaining a given training example for training a machine learning model, wherein:
      the machine learning model is configured to process an input comprising a sequence of words to generate a classification output comprising a respective score for each of multiple classes; and
      the given training example comprises: (i) a given training input comprising a sequence of words, and (ii) a target output that should be generated by the machine learning model by processing the given training input;
   generating a plurality of new training examples based on the given training example, wherein each new training example comprises: (i) a new training input comprising a sequence of words, and (ii) the target output, wherein generating each new training example comprises:
      identifying, from a search query log, a first set of multiple search queries based on the given training input corresponding to the given training example;
      identifying, from the search query log, a second set of multiple search queries based on the new training input corresponding to the new training example;

determining a sibling score between the given training input and the new training input based on: (i) the first set of multiple search queries, and (ii) the second set of multiple search queries; and determining that the sibling score between the given training input and the new training input satisfies an acceptance criterion; and training the machine learning model on the plurality of new training examples.

10. The system of claim 9, wherein the classification output generated by the machine learning model for an input comprises a score indicating if information on a given subject should be displayed to a user in response to the user submitting a search query comprising the input.

11. The system of claim 10, wherein the information on the given subject comprises weather information.

12. The system of claim 9, wherein:

the sequence of words of the given training input and the sequence of words of the new training input both satisfy a context template;

the context template comprises: (i) a sequence of one or more words and (ii) a wildcard representing variable data;

the sequence of words of the given training input comprises a target word sequence that corresponds to the wildcard in the context template; and the sequence of words of the new training input comprises a sibling word sequence that corresponds to the wildcard in the context template.

13. The system of claim 12, wherein each search query in the first set of search queries comprises the target word sequence and each search query in the second set of search queries comprises the sibling word sequence.

14. The system of claim 13, wherein:

the sibling score between the given training input and the new training input quantifies a similarity measure between a first set of search query templates and a second set of search query templates;

each search query template in the first set of search query templates comprises a sequence of one or more words and a wildcard and is defined by replacing the target word sequence in a search query from the first set of search queries by a wildcard; and each search query template in the second set of search query templates comprises a sequence of one or more words and a wildcard and is defined by replacing the sibling word sequence in a search query from the second set of search queries by a wildcard.

15. The system of claim 14, wherein the sibling score is based on a ratio of: (i) a number of search query templates common to both the first set of search query templates and the second set of search query templates, and (ii) a number of search query templates in the first set of search query templates or the second set of search query templates.

16. The system of claim 15, wherein the first set of search query templates and the second set of search query templates include a same number of search query templates.

17. One or more non-transitory computer storage media storing instructions that when executed by one or more computers cause the one or more computers to perform operations comprising:

obtaining a given training example for training a machine learning model, wherein:

the machine learning model is configured to process an input comprising a sequence of words to generate a classification output comprising a respective score for each of multiple classes; and the given training example comprises: (i) a given training input comprising a sequence of words, and (ii) a target output that should be generated by the machine learning model by processing the given training input;

generating a plurality of new training examples based on the given training example, wherein each new training example comprises: (i) a new training input comprising a sequence of words, and (ii) the target output, wherein generating each new training example comprises:

identifying, from a search query log, a first set of multiple search queries based on the given training input corresponding to the given training example;

identifying, from the search query log, a second set of multiple search queries based on the new training input corresponding to the new training example;

determining a sibling score between the given training input and the new training input based on: (i) the first set of multiple search queries, and (ii) the second set of multiple search queries; and determining that the sibling score between the given training input and the new training input satisfies an acceptance criterion; and training the machine learning model on the plurality of new training examples.

18. The non-transitory computer storage media of claim 17, wherein the classification output generated by the machine learning model for an input comprises a score indicating if information on a given subject should be displayed to a user in response to the user submitting a search query comprising the input.

19. The non-transitory computer storage media of claim 18, wherein the information on the given subject comprises weather information.

20. The non-transitory computer storage media of claim 17, wherein:

the sequence of words of the given training input and the sequence of words of the new training input both satisfy a context template;

the context template comprises: (i) a sequence of one or more words and (ii) a wildcard representing variable data;

the sequence of words of the given training input comprises a target word sequence that corresponds to the wildcard in the context template; and the sequence of words of the new training input comprises a sibling word sequence that corresponds to the wildcard in the context template.

* * * * *